United States Patent
Chin et al.

(10) Patent No.: US 8,452,351 B2
(45) Date of Patent: May 28, 2013

(54) METHODS AND APPARATUS FOR SAVING BATTERY POWER IN MOBILE STATIONS

(75) Inventors: Tom Chin, San Diego, CA (US); Shan Qing, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1261 days.

(21) Appl. No.: 12/131,387

(22) Filed: Jun. 2, 2008

(65) Prior Publication Data

US 2009/0298527 A1 Dec. 3, 2009

(51) Int. Cl.
*H04B 1/38* (2006.01)
*H04M 1/00* (2006.01)

(52) U.S. Cl.
USPC ...... 455/574; 455/572; 455/343.1; 455/343.2

(58) Field of Classification Search
USPC .......... 455/343.1–343.6, 574, 522, 69, 127.1, 455/127.5, 572; 370/318
See application file for complete search history.

(56) References Cited

U.S. PATENT DOCUMENTS

| | | | | |
|---|---|---|---|---|
| 5,745,860 | A * | 4/1998 | Kallin | 455/574 |
| 5,991,635 | A * | 11/1999 | Dent et al. | 455/517 |
| 6,199,134 | B1 * | 3/2001 | Deschepper et al. | 710/311 |
| 6,751,236 | B1 * | 6/2004 | Groenendaal | 370/522 |
| 7,467,289 | B1 * | 12/2008 | Garlick et al. | 712/228 |
| 7,924,757 | B2 * | 4/2011 | Yin | 370/311 |
| 2004/0042425 | A1 * | 3/2004 | Parnes | 370/328 |
| 2006/0029011 | A1 | 2/2006 | Etemad et al. | |
| 2007/0086416 | A1 * | 4/2007 | Jang et al. | 370/347 |
| 2007/0086425 | A1 | 4/2007 | Leow et al. | |
| 2007/0127403 | A1 * | 6/2007 | Lu et al. | 370/311 |
| 2007/0286066 | A1 * | 12/2007 | Zhang et al. | 370/208 |
| 2008/0175158 | A1 * | 7/2008 | Wiatrowski et al. | 370/242 |
| 2008/0320492 | A1 * | 12/2008 | James et al. | 719/314 |
| 2009/0067377 | A1 * | 3/2009 | Talukdar et al. | 370/329 |
| 2009/0097426 | A1 * | 4/2009 | Yin | 370/311 |
| 2009/0150933 | A1 * | 6/2009 | Lee et al. | 725/40 |
| 2011/0032897 | A1 * | 2/2011 | Ihm et al. | 370/329 |
| 2011/0032900 | A1 * | 2/2011 | Maheshwari et al. | 370/329 |
| 2011/0051666 | A1 * | 3/2011 | Kim et al. | 370/328 |

FOREIGN PATENT DOCUMENTS

| | | |
|---|---|---|
| JP | 2007509526 A | 4/2007 |
| JP | 2008508782 A | 3/2008 |

(Continued)

OTHER PUBLICATIONS

International Search Report/Written Opinion—PCT/US09/045021—International Search Authority EPO—Sep. 15, 2009.

(Continued)

*Primary Examiner* — Dominic E Rego
(74) *Attorney, Agent, or Firm* — Charles Chesney (57) ABSTRACT

A base station may be configured so that it operates in accordance with certain MAP transmission rules that may enable mobile stations to save battery power in certain situations. Upon receiving a MAP message, a mobile station may determine whether there is a burst allocated for the mobile station in the current frame by determining the value of at least one of the following: an idle users bit in the SUB-MAP pointer information element (IE), and a sleep users bit in the SUB-MAP pointer IE. The mobile station may discontinue processing of the MAP message and power down one or more components of the mobile station if there is not a burst allocated for the mobile station in the current frame.

19 Claims, 7 Drawing Sheets

FOREIGN PATENT DOCUMENTS

| | | |
|---|---|---|
| JP | 2008526092 A | 7/2008 |
| JP | 2010506540 A | 2/2010 |
| WO | 2006039812 A1 | 4/2006 |
| WO | 2006071051 A1 | 7/2006 |
| WO | 2006075870 A1 | 7/2006 |
| WO | 2006115999 A2 | 11/2006 |
| WO | 2008045502 A2 | 4/2008 |

OTHER PUBLICATIONS

P802.16Rev2/D4 (Apr. 2008) Part 16: Air interface for broadband wireless access systems, Draft Standard for Local and Metropolitan Area Networks, Apr. 1, 2008, pp. 1-902, Ch Intro, Ch 6.3.2.3.2, 6.3.21, 6.3.24, 8.4.5.3, 8.4.5.6.

Standards: "IEEE Part 16: Air Interface for Broadband Wireless Access Systems", P802.16Rev2/D8 Dec. 2008, Section 6.3.2.3.55 OFDMA SUB-DL-UL-MAP Message, Dec. 2008.

Standards: "IEEE Part 16: Air Interface for Broadband Wireless Access Systems", P802.16Rev2/D8 Dec. 2008, Section 8.4.5.3.10 HARQ and Sub-MAP Pointer IE, Dec. 2008.

Taiwan Search Report—TW098117359—TIPO—Nov. 2, 2012.

\* cited by examiner

METHODS AND APPARATUS FOR SAVING BATTERY POWER IN MOBILE STATIONS

TECHNICAL FIELD

The present disclosure relates generally to wireless communication systems. More specifically, the present disclosure relates to methods and apparatus for saving battery power in mobile stations.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, a subscriber station, an access terminal, a remote station, a user terminal, a terminal, a subscriber unit, user equipment, etc. The term "mobile station" will be used herein.

A wireless communication system may provide communication for a number of cells, each of which may be serviced by a base station. A base station may be a fixed station that communicates with mobile stations. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station. A wireless communication system may simultaneously support communication for multiple mobile stations.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

DETAILED DESCRIPTION

The methods and apparatus of the present disclosure may be utilized in a broadband wireless communication system. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Some of the examples described herein are relevant to wireless communication systems that are configured in accordance with WiMAX standards. However, these examples should not be interpreted as limiting the scope of the present disclosure.

Mobile WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

In mobile WiMAX, a slot is the smallest unit to allocate bandwidth to users. A slot refers to a subchannel (i.e., a group of subcarriers) over a slot duration (i.e., a certain number of symbols). A burst is an allocation of one or more continuous slots with the same modulation and coding scheme.

As used herein, the term "frame" refers to a time interval of constant length. Mobile WiMAX supports time division duplex (TDD) operation. For a TDD implementation, each frame is divided into downlink (DL) and uplink (UL) sub-frames. Control information is transmitted during a frame. The control information is in the format of MAP messages at the beginning of each frame. The MAP messages define the DL and the UL allocation.

Several different types of MAP messages are defined. These include the DL-MAP message and the UL-MAP message, the compressed DL MAP message and the compressed UL MAP message, and the SUB-DL-UL-MAP message.

In accordance with the mobile WiMAX standard, the compressed DL MAP message may include a SUB-MAP pointer information element (IE). A SUB-MAP pointer IE can point to a location in the DL sub-frame that contains a SUB-DL-UL-MAP message, which can allocate a burst for the mobile station to receive.

In accordance with the mobile WiMAX standard (IEEE 802.16e), a mobile station may be in sleep mode or idle mode.

When a mobile station is in sleep mode, the mobile station powers down one or more physical components to save battery power while maintaining traffic connection(s). When a mobile station is in idle mode, the mobile station has released the traffic connection(s). Thus, the idle mode may be viewed as a "deep" sleep.

When the mobile station is in sleep mode or in idle mode, the mobile station periodically wakes up to monitor all DL MAP, compressed MAP and SUB-DL-UL-MAP messages to know whether there is a media access control (MAC) management message or data traffic that is destined for the mobile station. However, processing all of the MAP and SUB-MAP messages in their entirety may consume a significant amount of battery power.

The mobile WiMAX standard has defined one bit in the SUB-MAP pointer IE of the compressed DL MAP message to indicate whether there is a burst allocated by the corresponding SUB-DL-UL-MAP message, pointed by the SUB-MAP pointer IE, in the present frame for mobile stations that are in sleep mode. This bit may be referred to herein as the sleep users bit. If the sleep users bit is a first value (e.g., "1") then there are one or more bursts in the present frame that are allocated by the SUB-DL-UL-MAP message, pointed by the corresponding SUB-MAP pointer IE that contains this sleep users bit, for mobile stations that are in sleep mode. If the sleep users bit is a second value (e.g., "0") then there are not any bursts in the present frame that are allocated by the SUB-DL-UL-MAP message, pointed by the corresponding SUB-MAP pointer IE that contains this sleep users bit, for mobile stations that are in sleep mode.

Similarly, the mobile WiMAX standard has defined one bit in the SUB-MAP pointer IE of the compressed DL MAP message to indicate whether there is a burst allocated by the corresponding SUB-DL-UL-MAP message, pointed by the SUB-MAP pointer IE, in the present frame for mobile stations that are in idle mode. This bit may be referred to herein as the idle users bit. If the idle users bit is a first value (e.g., "1") then there are one or more bursts in the present frame that are allocated by the SUB-DL-UL-MAP message, pointed by the corresponding SUB-MAP pointer IE that contains this idle users bit, for mobile stations that are in idle mode. If the idle users bit is a second value (e.g. "0") then there are not any bursts in the present frame that are allocated by the SUB-DL-UL-MAP message, pointed by the corresponding SUB-MAP pointer IE that contains this idle users bit, for mobile stations that are in idle mode.

The present disclosure relates to techniques for enabling the mobile station to save battery power. More specifically, the present disclosure proposes a method for permitting a mobile station that is in sleep mode or idle mode to quickly determine whether there is a burst allocated for the mobile station in the present frame. Advantageously, if there is not a burst allocated for the mobile station in the present frame, then the mobile station may be able to go back to sleep without having to completely parse all the MAP and SUB-MAP messages, which may require a lot of software processing time.

A method for saving battery power in a mobile station is disclosed. The method may be implemented by a mobile station. The method may include receiving a MAP message that comprises a SUB-MAP pointer information element (IE). The method may also include determining whether there is a burst allocated for the mobile station in the current frame by determining the value of at least one of the following: an idle users bit in the SUB-MAP pointer IE, and a sleep users bit in the SUB-MAP pointer IE. The method may also include discontinuing processing of the MAP message and powering down one or more components of the mobile station if there is not a burst allocated for the mobile station in the current frame.

A method for transmitting MAP messages so as to facilitate battery power savings by mobile stations is also disclosed. The method may include transmitting a MAP message in a downlink (DL) sub-frame of a current frame. The method may also include using only SUB-DL-UL-MAP messages to allocate data bursts for mobile stations that are in idle mode or sleep mode. The method may also include using only a single SUB-MAP pointer information element (IE) for all the mobile stations that are in idle mode or sleep mode for which bursts have been allocated in the current frame. The method may also include transmitting the SUB-MAP pointer IE as the first IE in the MAP message.

A mobile station that is configured for saving battery power is also disclosed. The mobile station may include a receiver that is configured to receive a MAP message that comprises a SUB-MAP pointer information element (IE). The mobile station may also include a decoder that is configured to determine whether there is a burst allocated for the mobile station in the current frame by determining the value of at least one of the following: an idle users bit in the SUB-MAP pointer IE, and a sleep users bit in the SUB-MAP pointer IE. If there is not a burst allocated for the mobile station in the current frame, the mobile station may discontinue processing of the MAP message and power down one or more components of the mobile station.

A base station that is configured for transmitting MAP messages so as to facilitate battery power savings by mobile stations is also disclosed. The base station includes a processor, memory in electronic communication with the processor, and instructions stored in the memory. The instructions may be executable to transmit a MAP message in a downlink (DL) sub-frame of a current frame. The instructions may also be executable to use only SUB-DL-UL-MAP messages to allocate data bursts for mobile stations that are in idle mode or sleep mode. The instructions may also be executable to use only a single SUB-MAP pointer information element (IE) for all the mobile stations that are in idle mode or sleep mode for which bursts have been allocated in the current frame. The instructions may also be executable to transmit the SUB-MAP pointer IE as the first IE in the MAP message.

A mobile station that is configured for saving battery power is also disclosed. The mobile station may include means for receiving a MAP message that comprises a SUB-MAP pointer information element (IE). The mobile station may also include means for determining whether there is a burst allocated for the mobile station in the current frame by determining the value of at least one of the following: an idle users bit in the SUB-MAP pointer IE, and a sleep users bit in the SUB-MAP pointer IE. The mobile station may also include means for discontinuing processing of the MAP message and powering down one or more components of the mobile station if there is not a burst allocated for the mobile station in the current frame.

A base station that is configured for transmitting MAP messages so as to facilitate battery power savings by mobile stations is also disclosed. The base station may include means for transmitting a MAP message in a downlink (DL) sub-frame of a current frame. The base station may also include means for using only SUB-DL-UL-MAP messages to allocate data bursts for mobile stations that are in idle mode or sleep mode. The base station may also include means for using only a single SUB-MAP pointer information element (IE) for all the mobile stations that are in idle mode or sleep mode for which bursts have been allocated in the current frame. The base station may also include means for transmitting the SUB-MAP pointer IE as the first IE in the MAP message.

A computer-program product for facilitating battery power savings in a mobile station is also disclosed. The computer-program product includes a computer readable medium having instructions thereon. The instructions may include code for receiving a MAP message that comprises a SUB-MAP pointer information element (IE). The instructions may also include code for determining whether there is a burst allocated for the mobile station in the current frame by determining the value of at least one of the following: an idle users bit in the SUB-MAP pointer IE, and a sleep users bit in the SUB-MAP pointer IE. The instructions may also include code for discontinuing processing of the MAP message and powering down one or more components of the mobile station if there is not a burst allocated for the mobile station in the current frame.

A computer-program product for transmitting MAP messages so as to facilitate battery power savings by mobile stations is also disclosed. The computer-program product includes a computer readable medium having instructions thereon. The instructions may include code for transmitting a MAP message in a downlink (DL) sub-frame of a current frame. The instructions may also include code for using only SUB-DL-UL-MAP messages to allocate data bursts for mobile stations that are in idle mode or sleep mode. The instructions may also include code for using only a single SUB-MAP pointer information element (IE) for all the mobile stations that are in idle mode or sleep mode for which bursts have been allocated in the current frame. The instructions may also include code for transmitting the SUB-MAP pointer IE as the first IE in the MAP message.

Figure 1:
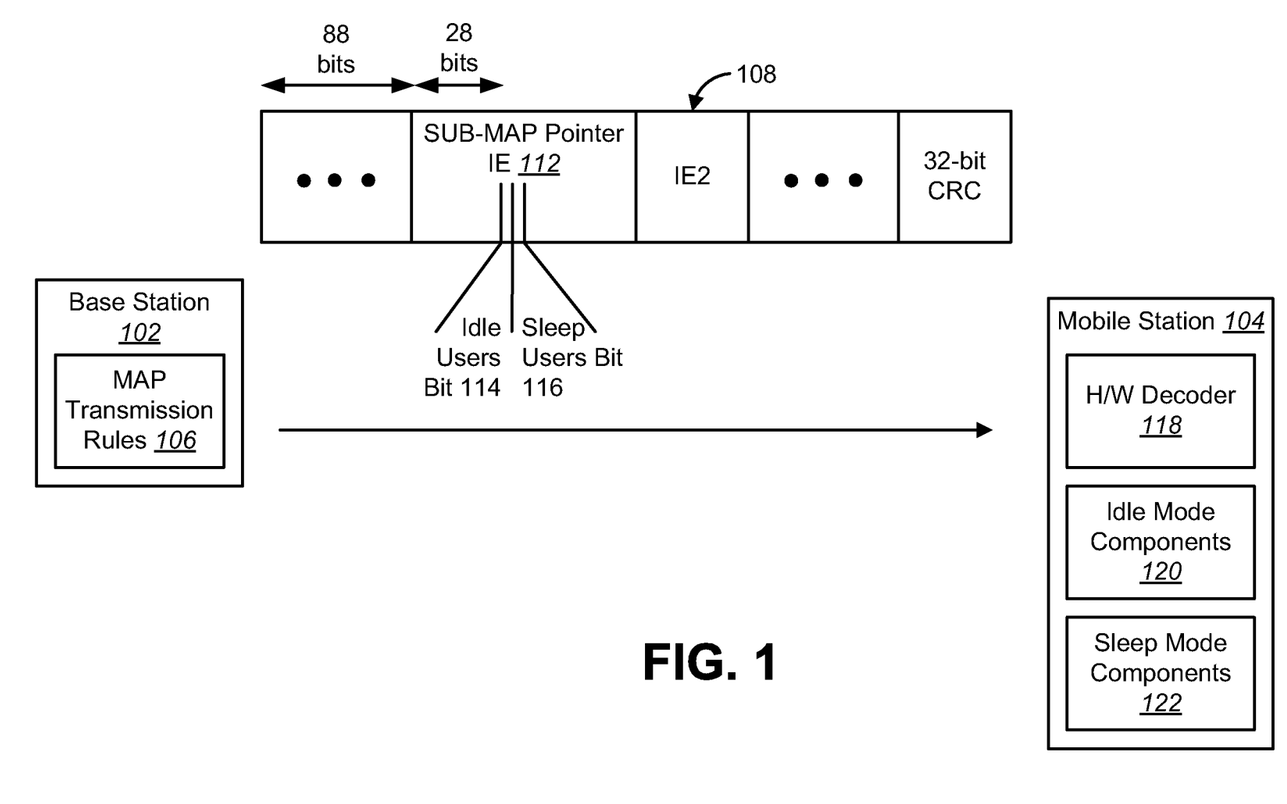
FIG. 1 illustrates a base station and a mobile station that may be configured to implement methods for saving battery power in accordance with the present disclosure.

Referring to FIG. 1, a base station 102 is shown in electronic communication with a mobile station 104. Communication between the base station 102 and the mobile station 104 may occur in accordance with the mobile WiMAX standard.

The mobile station 104 may be configured so that it may operate in sleep mode or idle mode, in addition to traffic mode. As indicated above, when a mobile station 104 is in sleep mode, the mobile station 104 powers down one or more physical components to save battery power while maintaining traffic connection(s). When a mobile station 104 is in idle mode, the mobile station 104 has released the traffic connection(s).

The mobile station 104 is shown with components 120 for transitioning to and operating in idle mode. The mobile station 104 is also shown with components 122 for transitioning to and operating in sleep mode. These components 120, 122 may include a combination of software and hardware components.

In accordance with the mobile WiMAX standard, control information in the form of MAP messages may be transmitted at the beginning of each frame. The MAP messages define the DL and the UL allocation. Several different types of MAP messages are defined, including the compressed DL MAP message 108. FIG. 1 shows a compressed DL MAP message 108 being transmitted from the base station 102 to the mobile station 104. The compressed DL MAP message 108 may be transmitted during a downlink sub-frame.

The compressed DL MAP message 108 may include a SUB-MAP pointer information element (IE) 112. The SUB-MAP pointer IE 112 can point to a location in the DL sub-frame that contains a SUB-DL-UL-MAP message, which can allocate a burst for the mobile station 104 to receive.

The mobile WiMAX standard has defined one bit 114 in the SUB-MAP pointer IE 112 of the compressed DL MAP message 108 to indicate whether there is a burst allocated by the corresponding SUB-DL-UL-MAP message, pointed by the SUB-MAP pointer IE, in the present frame for mobile stations 104 that are in idle mode. This bit 114 may be referred to herein as the idle users bit 114.

The mobile WiMAX standard has defined one bit 116 in the SUB-MAP pointer IE 112 of the compressed DL MAP message 108 to indicate whether there is a burst allocated by the corresponding SUB-DL-UL-MAP message, pointed by the SUB-MAP pointer IE, in the present frame for mobile stations 104 that are in sleep mode. This bit 116 may be referred to herein as the sleep users bit 116.

The base station 102 may be configured so that it operates in accordance with certain rules 106 that govern how the base station 102 transmits MAP messages, such as the compressed DL MAP message 108. These rules 106 may be referred to herein as MAP transmission rules 106. By transmitting MAP messages in accordance with the MAP transmission rules 106, the base station 102 may enable mobile stations 104 to save battery power in certain situations.

In accordance with the MAP transmission rules 106, the base station 102 uses only the SUB-DL-UL-MAP message to allocate data burst(s) for the mobile stations 104 that are in sleep mode or in idle mode. In other words, the base station 102 does not use the normal DL MAP message or the compressed DL MAP message 108 to allocate data burst(s). Instead, the base station 102 only uses the compressed DL MAP message to transmit other control information, such as the SUB-MAP pointer IE, etc. In addition, the base station 102 only uses one single SUB-MAP pointer IE 112 for the mobile stations 104 that are in sleep mode or in idle mode. In addition, the base station 102 transmits the SUB-MAP pointer IE 112 for the mobile stations 104 that are in sleep mode or in idle mode as the first IE in the compressed DL MAP message 108.

If the base station 102 follows the MAP transmission rules 106, the idle users bit 114 would always be located at the same location in the compressed DL MAP message 108, and the sleep users bit 116 would also always be located at the same location in the compressed DL MAP message 108. In other words, the location of the idle users bit 114 and the sleep users bit 116 are known in advance by the mobile station 104.

For example, in accordance with the current version of the WiMAX standard, there are 88 bits before the first IE 112 in the compressed DL MAP message 108. There are 28 bits before the idle users bit 114 in the SUB-MAP pointer IE 112. The sleep users bit 116 is located directly after the idle users bit 114. Thus, in accordance with the current version of the WiMAX standard, the idle users bit 114 would always be located at bit 88+28+1=117 in the compressed DL MAP message 108. The sleep users 116 bit would always be located at bit 88+28+2=118 in the compressed DL MAP message 108.

If the idle users bit 114 and the sleep users bit 116 are always located at the same location in the compressed DL MAP message 108, the mobile station 104 may quickly determine the value of these bits 114, 116. In fact, the value of the idle users bit 114 and/or the value of the sleep users bit 116 may be determined in hardware. For example, the mobile station 104 may include a hardware decoder 118. The hardware decoder 118 may perform pattern matching with respect to the compressed DL MAP message 108 to determine the value of the idle users bit 114 and/or the sleep users bit 116.

If the mobile station 104 is in idle mode or in sleep mode, the mobile station 104 may determine the value of the idle users bit 114 and/or the sleep users bit 116 without processing all of the MAP and SUB-MAP messages in their entirety. This may be beneficial if there are not any bursts that have been allocated for the mobile station 104 in the present frame. In this case, the mobile station 104 may go back to sleep (i.e., power down one or more physical components) earlier than if all of the MAP and SUB-MAP messages had to be processed in their entirety. This may result in increased savings of battery power for the mobile station 104.

Although in FIG. 1 the mobile station 104 is shown with a hardware decoder 118, it is not necessary that the value of the idle users bit 114 and/or the sleep users bit 116 be determined in hardware. The value of the idle users bit 114 and/or the sleep users bit 116 may alternatively be determined in software. However, it is contemplated that a hardware-based implementation may provide greater advantages (e.g., speed) than a software-based implementation.

Figure 2:
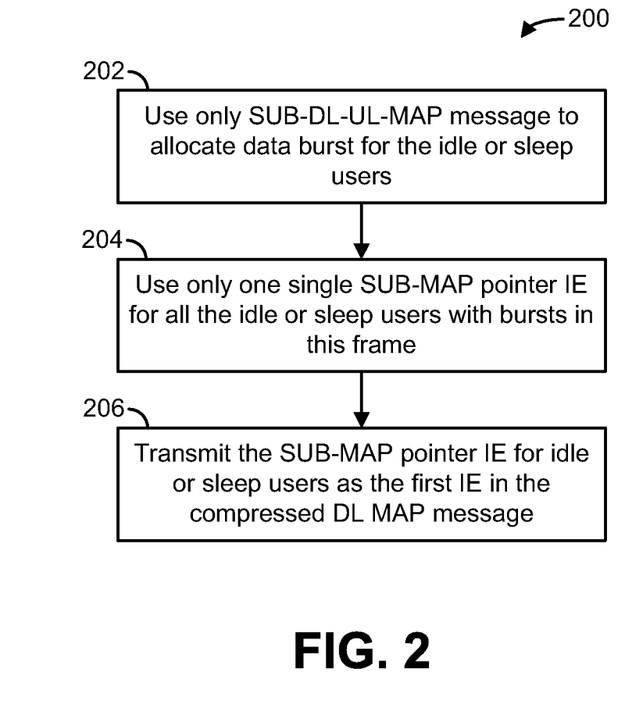
FIG. 2 illustrates a method showing how a base station may transmit MAP messages in accordance with certain rules.

FIG. 2 illustrates a method 200 showing how the base station 102 may transmit MAP messages in accordance with the MAP transmission rules 106. By transmitting MAP messages in accordance with the MAP transmission rules 106, the base station 102 may enable mobile stations 104 to save battery power.

In accordance with the MAP transmission rules 106, the base station 102 uses 202 only the SUB-DL-UL-MAP message to allocate data burst(s) for the mobile stations 104 that are in sleep mode or in idle mode. In other words, the base station 102 does not use the normal DL MAP message or the compressed DL MAP message 108 to allocate data burst(s). In addition, the base station 102 only uses 204 one single SUB-MAP pointer IE 112 for the mobile stations 104 that are in sleep mode or in idle mode. In addition, the base station 102 transmits 206 the SUB-MAP pointer IE 112 for the mobile stations 104 that are in sleep mode or in idle mode as the first IE in the compressed DL MAP message 108.

Figure 3:
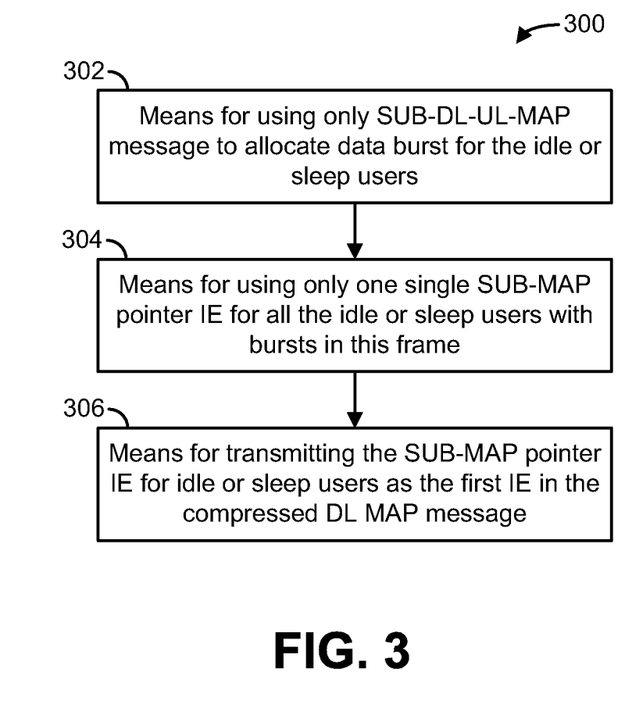
FIG. 3 illustrates means-plus-function blocks corresponding to the method of FIG. 2.

The method 200 of FIG. 2 described above may be performed by various hardware and/or software component(s) and/or module(s) corresponding to the means-plus-function blocks 300 illustrated in FIG. 3. In other words, blocks 202 through 206 illustrated in FIG. 2 correspond to means-plus-function blocks 302 through 306 illustrated in FIG. 3.

Figure 4:
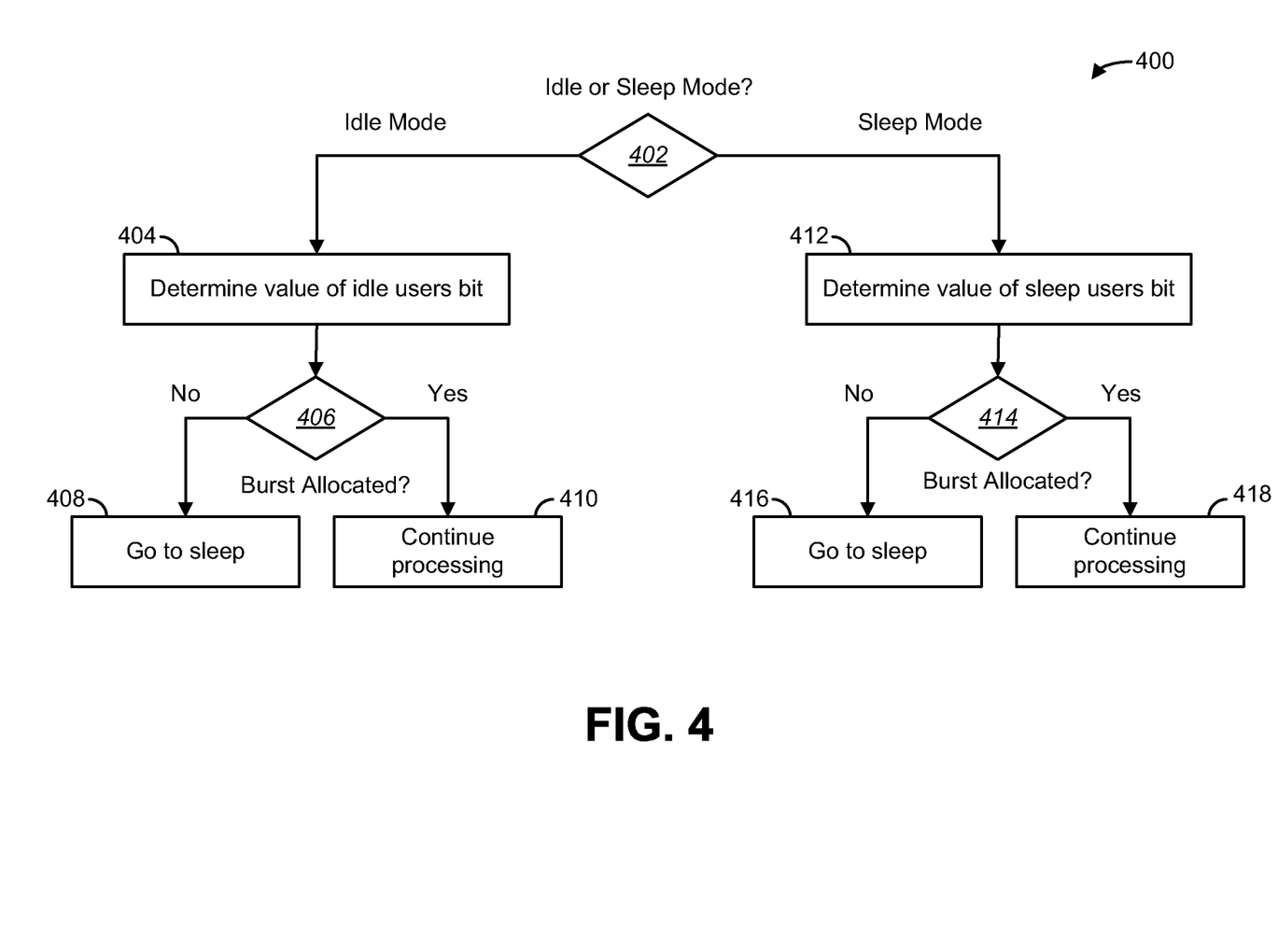
FIG. 4 illustrates a method for saving battery power in accordance with the present disclosure.

FIG. 4 illustrates a method 400 for saving battery power in accordance with the present disclosure. More specifically, FIG. 4 illustrates how the mobile station 104 may process MAP messages in accordance with the present disclosure.

In accordance with the depicted method 400, the mobile station 104 may determine 402 whether it is in idle mode or sleep mode. If it is determined 402 that the mobile station 104 is in idle mode, then the mobile station 104 may determine 404 the value of the idle users bit 114 in the compressed DL MAP message 108.

If the base station 102 transmits MAP messages in accordance with the MAP transmission rules 106, then the idle users bit 114 is always located at the same location in the compressed DL MAP message 108, so that the location of the idle users bit 114 is known in advance by the mobile station 104. Thus, the mobile station 104 may quickly determine 404 the value of the idle users bit 114 by performing pattern matching with respect to the compressed DL MAP message 108. More specifically, the mobile station 104 may check a specific, predetermined location of the compressed DL MAP message 108 that corresponds to the idle users bit 114. This pattern matching may be implemented in hardware (e.g., via a hardware decoder 118). Alternatively, this pattern matching may be implemented in software.

If the idle users bit 114 is a first value (e.g., "1") then there are one or more bursts in the present frame that are allocated for mobile stations 104 that are in idle mode. If the idle users bit 114 is a second value (e.g., "0") then there are not any bursts in the present frame that are allocated for mobile stations 104 that are in idle mode.

If the value of the idle users bit 114 indicates 406 that there are not any bursts in the present frame that are allocated for mobile stations 104 that are in idle mode, then the mobile station 104 may go to sleep 408. The mobile station 104 may go to sleep 408 immediately, without processing all of the MAP and SUB-MAP messages in their entirety. However, if the value of the idle users bit 114 indicates 406 that there are one or more bursts in the present frame that are allocated for mobile stations 104 that are in idle mode, then the mobile station 104 may continue processing 410 the downlink sub-frame without going to sleep.

If it is determined 402 that the mobile station 104 is in sleep mode, then the mobile station 104 may determine 412 the value of the sleep users bit 116 in the compressed DL MAP message 108.

If the base station 102 transmits MAP messages in accordance with the MAP transmission rules 106, then the sleep users bit 116 is always located at the same location in the compressed DL MAP message 108, so that the location of the sleep users bit 116 is known in advance by the mobile station 104. Thus, the mobile station 104 may quickly determine 412 the value of the sleep users bit 116 by performing pattern matching with respect to the compressed DL MAP message 108. More specifically, the mobile station 104 may check a specific, predetermined location of the compressed DL MAP message 108 that corresponds to the sleep users bit 116. This pattern matching may be implemented in hardware (e.g., via a hardware decoder 118). Alternatively, this pattern matching may be implemented in software.

If the sleep users bit 116 is a first value (e.g., "1") then there are one or more bursts in the present frame that are allocated for mobile stations 104 that are in sleep mode. If the sleep users bit 116 is a second value (e.g., "0") then there are not any bursts in the present frame that are allocated for mobile stations 104 that are in sleep mode.

If the value of the sleep users bit 116 indicates 414 that there are not any bursts in the present frame that are allocated for mobile stations 104 that are in sleep mode, then the mobile station 104 may go to sleep 416. The mobile station 104 may go to sleep 416 immediately, without processing all of the MAP and SUB-MAP messages in their entirety. However, if the value of the sleep users bit 116 indicates 414 that there are one or more bursts in the present frame that are allocated for mobile stations 104 that are in sleep mode, then the mobile station 104 may continue processing 418 the downlink sub-frame without going to sleep.

Figure 5:
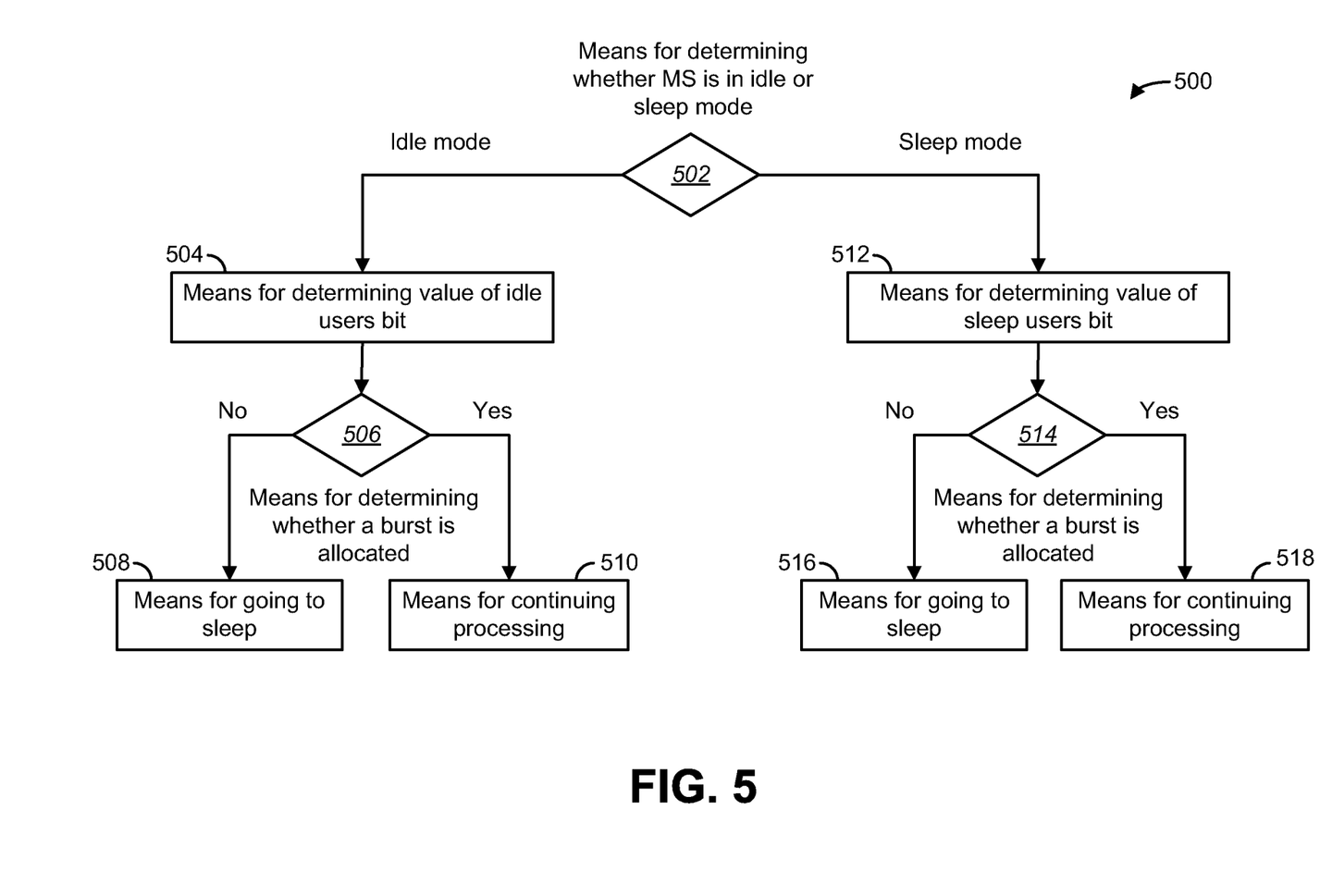
FIG. 5 illustrates means-plus-function blocks corresponding to the method of FIG. 4.

The method 400 of FIG. 4 described above may be performed by various hardware and/or software component(s) and/or module(s) corresponding to the means-plus-function blocks 500 illustrated in FIG. 5. In other words, blocks 402 through 418 illustrated in FIG. 4 correspond to means-plus-function blocks 502 through 518 illustrated in FIG. 5.

Figure 6:
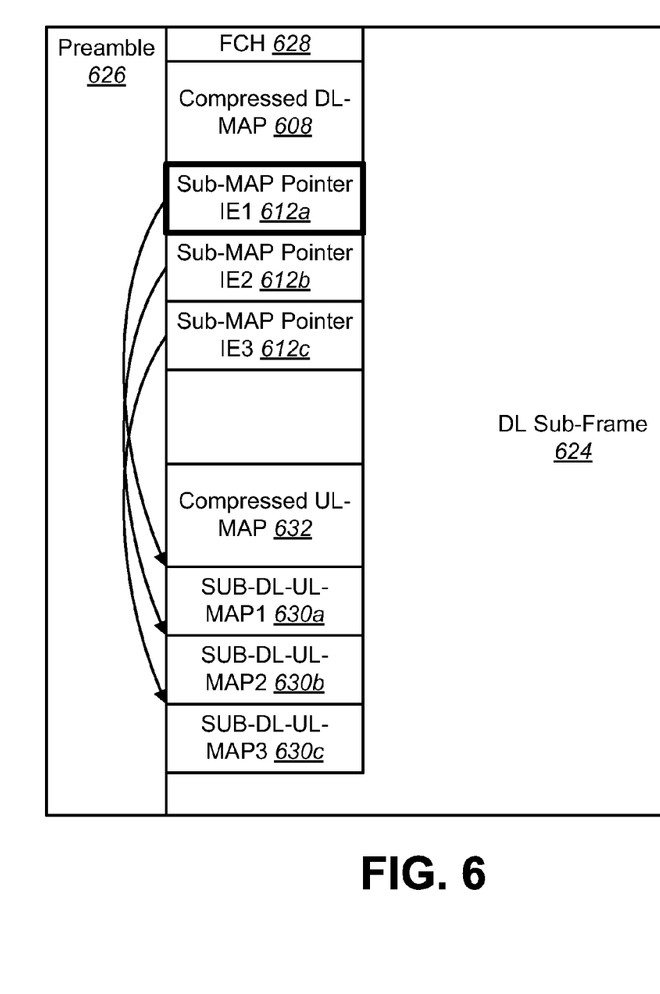
FIG. 6 illustrates an example of a downlink sub-frame.

FIG. 6 illustrates an example of a downlink (DL) sub-frame 624. The DL sub-frame 624 may include a preamble 626 and a frame control header (FCH) 628. The DL sub-frame 624 may also include a compressed DL MAP message 608 and a compressed UL MAP message 632. The compressed DL MAP message 608 may include up to three SUB-MAP pointer IEs 612a-c. Each SUB-MAP pointer IE 612 can point to a location in the DL sub-frame 624 that contains a SUB-DL-UL-MAP message 630, which can allocate one or more bursts for one or more mobile stations 104 to receive. In the example shown in FIG. 6, the first SUB-MAP pointer IE 612a points to a first SUB-DL-UL-MAP message 630a, the second SUB-MAP pointer IE 612b points to a second SUB-DL-UL-MAP message 630b, and the third SUB-MAP pointer IE 612c points to a third SUB-DL-UL-MAP message 630c.

In accordance with the present disclosure, the base station 102 only uses one single SUB-MAP pointer IE 612 for the mobile stations 104 that are in sleep mode or in idle mode. In addition, the base station 102 transmits the SUB-MAP pointer IE 612 for the mobile stations 104 that are in sleep mode or in idle mode as the first IE 612a in the compressed DL MAP message 608 (which is highlighted in FIG. 6).

Figure 7:
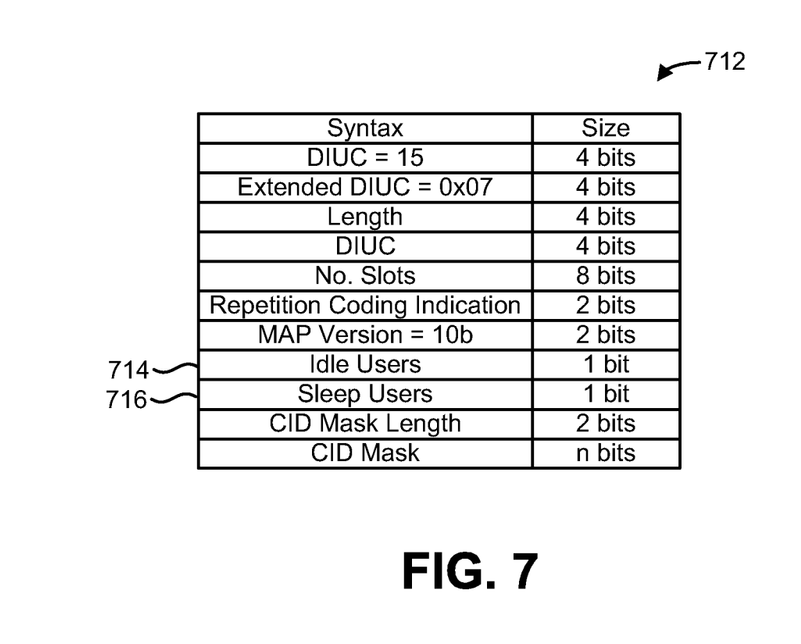
FIG. 7 illustrates an example of the structure of a SUB-MAP pointer IE.

FIG. 7 illustrates an example of the structure of a SUB-MAP pointer IE 712. The SUB-MAP pointer IE 712 includes an idle users bit 714 and a sleep users bit 716. The idle users bit 714 indicates whether there is a burst allocated in the present frame for mobile stations 104 that are in idle mode. The sleep users bit 716 indicates whether there is a burst allocated in the present frame for mobile stations 104 that are in sleep mode.

In accordance with the current version of the WiMAX standard, there are 28 bits before the idle users bit 714 in the SUB-MAP pointer IE 712. The sleep users bit 716 is located directly after the idle users bit 714 (i.e., there are 29 bits before the sleep users bit 716 in the SUB-MAP pointer IE 712).

Figure 8:
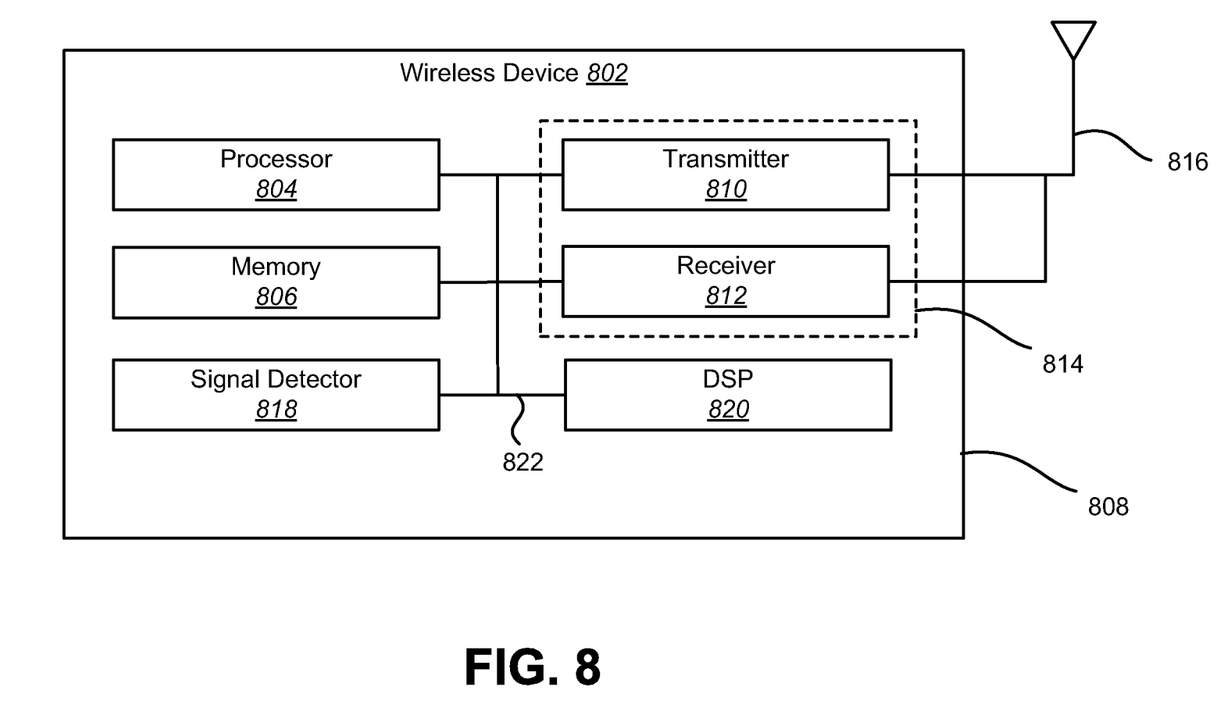
FIG. 8 illustrates various components that may be utilized in a wireless device.

FIG. 8 illustrates various components that may be utilized in a wireless device 802. The wireless device 802 is an example of a device that may be configured to implement the various methods described herein. The wireless device 802 may be a base station 102 or a mobile station 104.

The wireless device 802 may include a processor 804 which controls operation of the wireless device 802. The processor 804 may also be referred to as a central processing unit (CPU). Memory 806, which may include both read-only memory (ROM) and random access memory (RAM), provides instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable to implement the methods described herein.

The wireless device 802 may also include a housing 808 that may include a transmitter 810 and a receiver 812 to allow transmission and reception of data between the wireless device 802 and a remote location. The transmitter 810 and receiver 812 may be combined into a transceiver 814. An antenna 816 may be attached to the housing 808 and electrically coupled to the transceiver 814. The wireless device 802 may also include (not shown) multiple transmitters, multiple receivers, multiple transceivers and/or multiple antenna.

The wireless device 802 may also include a signal detector 818 that may be used to detect and quantify the level of signals received by the transceiver 814. The signal detector 818 may detect such signals as total energy, power spectral density, and other signals. The wireless device 802 may also include a digital signal processor (DSP) 820 for use in processing signals.

The various components of the wireless device 802 may be coupled together by a bus system 822 which may include a power bus, a control signal bus, and a status signal bus in addition to a data bus. However, for the sake of clarity, the various buses are illustrated in FIG. 8 as the bus system 822.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 2-5, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. In a mobile station, a method for saving battery power, comprising:
   receiving a Media Access Protocol (MAP) message that comprises a sub-Media Access Protocol (SUB-MAP) pointer information element (IE);
   determining whether there is a burst allocated for the mobile station in a current frame by determining a value of at least one of the following: an idle users bit in the SUB-MAP pointer IE, and a sleep users bit in the SUB-MAP pointer IE; and
   discontinuing processing of the MAP message without processing the MAP message in its entirety and powering down one or more components of the mobile station if there is not a burst allocated for the mobile station in the current frame.

2. The method of claim 1, wherein a location of the idle users bit and a location of the sleep users bit are known in advance by the mobile station.

3. The method of claim 1, wherein determining the value of at least one of the idle users bit and the sleep users bit is performed in hardware.

4. The method of claim 1, wherein determining the value of at least one of the idle users bit and the sleep users bit comprises pattern matching.

5. The method of claim 1, wherein the mobile station is in idle mode, and wherein the method comprises determining the value of the idle users bit.

6. The method of claim 1, wherein the mobile station is in sleep mode, and wherein the method comprises determining the value of the sleep users bit.

7. The method of claim 1, wherein the MAP message is a compressed downlink (DL) MAP message.

8. The method of claim 1, wherein the mobile station is configured to operate in accordance with an Institute of Electronic and Electrical Engineers (IEEE) 802.16 standard.

9. A mobile station that is configured for saving battery power, comprising:
   a receiver that is configured to receive a Media Access Protocol (MAP) message that comprises a sub-Media Access Protocol (SUB-MAP) pointer information element (IE); and
   a decoder that is configured to determine whether there is a burst allocated for the mobile station in a current frame by determining a value of at least one of the following: an idle users bit in the SUB-MAP pointer IE, and a sleep users bit in the SUB-MAP pointer IE;
   wherein if there is not a burst allocated for the mobile station in the current frame, the mobile station discontinues processing of the MAP message without processing the MAP message in its entirety and powers down one or more components of the mobile station.

10. The mobile station of claim 9, wherein the location of an idle users bit and a location of the sleep users bit are known in advance by the mobile station.

11. The mobile station of claim 9, wherein the decoder is implemented in hardware.

12. The mobile station of claim 9, wherein determining the value of at least one of the idle users bit and the sleep users bit comprises pattern matching.

13. A mobile station that is configured for saving battery power, comprising:
   means for receiving a Media Access Protocol (MAP) message that comprises a sub-Media Access Protocol (SUB-MAP) pointer information element (IE);
   means for determining whether there is a burst allocated for the mobile station in a current frame by determining a value of at least one of the following: an idle users bit in the SUB-MAP pointer IE, and a sleep users bit in the SUB-MAP pointer IE; and
   means for discontinuing processing of the MAP message without processing the MAP message in its entirety and powering down one or more components of the mobile station if there is not a burst allocated for the mobile station in the current frame.

14. The mobile station of claim 13, wherein a location of the idle users bit and a location of the sleep users bit are known in advance by the mobile station.

15. The mobile station of claim 13, wherein the means for determining whether there is a burst allocated for the mobile station is implemented in hardware.

16. The mobile station of claim 13, wherein determining the value of at least one of the idle users bit and the sleep users bit comprises pattern matching.

17. A computer-program product for facilitating battery power savings in a mobile station, the computer-program product comprising a non-transitory computer readable medium having instructions thereon, the instructions comprising:
   code for receiving a Media Access Protocol (MAP) message that comprises a sub-Media Access Protocol (SUB-MAP) pointer information element (IE);
   code for determining whether there is a burst allocated for the mobile station in a current frame by determining a value of at least one of the following: an idle users bit in the SUB-MAP pointer IE, and a sleep users bit in the SUB-MAP pointer IE; and
   code for discontinuing processing of the MAP message without processing the MAP message in its entirety and powering down one or more components of the mobile station if there is not a burst allocated for the mobile station in the current frame.

18. The computer-program product of claim 17, wherein a location of the idle users bit and a location of the sleep users bit are known in advance by the mobile station.

19. The computer-program product of claim 17, wherein determining the value of at least one of the idle users bit and the sleep users bit comprises pattern matching.

* * * * *